US012570236B1

(12) United States Patent
Long

(10) Patent No.: US 12,570,236 B1
(45) Date of Patent: Mar. 10, 2026

(54) VEHICLE MOVEMENT RESTRICTIONS PREMISED ON ELECTRONIC KEYS

(71) Applicant: Engle Grange, LLC, Wichita Falls, TX (US)

(72) Inventor: Donna Long, Wichita Falls, TX (US)

(73) Assignee: Engle Grange, LLC, Wichita Falls, TX (US)

( * ) Notice: Subject to any disclaimer, the term of this patent is extended or adjusted under 35 U.S.C. 154(b) by 0 days.

(21) Appl. No.: 18/827,643

(22) Filed: Sep. 6, 2024

Related U.S. Application Data

(60) Continuation of application No. 17/342,260, filed on Jun. 8, 2021, now abandoned, which is a continuation of application No. 17/013,366, filed on Sep. 4, 2020, now abandoned, which is a continuation of application No. 16/566,618, filed on Sep. 10, 2019, now Pat. No. 10,766,454, which is a continuation of application No. 16/185,459, filed on Nov. 9, 2018, now Pat. No. 10,442,397, which is a continuation of application No. 15/959,029, filed on Apr. 20, 2018, now Pat. No. 10,189,441, which is a continuation of (Continued)

(51) Int. Cl.
| | |
|---|---|
| B60R 25/04 | (2013.01) |
| B60R 25/102 | (2013.01) |
| B60R 25/24 | (2013.01) |
| G07C 9/00 | (2020.01) |
| B60R 25/10 | (2013.01) |

(52) U.S. Cl.
CPC ............ B60R 25/04 (2013.01); B60R 25/102 (2013.01); B60R 25/24 (2013.01); G07C 9/00309 (2013.01); B60R 2025/1016
(2013.01); G07C 2009/00793 (2013.01); G07C 2009/00984 (2013.01); G07C 2209/63 (2013.01)

(58) Field of Classification Search
CPC ....... B60R 25/04; B60R 25/102; B60R 25/24; B60R 2025/1016; G07C 9/00309; G07C 2009/00793; G07C 2009/00984; G07C 2209/63
See application file for complete search history.

(56) References Cited

U.S. PATENT DOCUMENTS

| | | | | |
|---|---|---|---|---|
| 5,150,593 A | * | 9/1992 | Kobayashi | ............ B60R 25/066 70/279.1 |
| 5,736,935 A | | 4/1998 | Lambropoulos | |

(Continued)

FOREIGN PATENT DOCUMENTS

| | | |
|---|---|---|
| KR | 10-0901292 | 6/2009 |

OTHER PUBLICATIONS

Non-Final Office Action for U.S. Appl. No. 12/858,071 mailed Mar. 29, 2013.

(Continued)

*Primary Examiner* — Peter D Nolan
*Assistant Examiner* — Wae L Louie

(57) ABSTRACT

An ignition start system in which authentication of a key is carried out twice, first to activate the ignition switch to allow starting the engine and second at the time prior to moving the vehicle from a parked position. The two step authentication prevents driving off in a car that has been started without having the key for security purposes and also to avoid inconvenient situations that can otherwise occur.

20 Claims, 2 Drawing Sheets

Related U.S. Application Data application No. 14/036,250, filed on Sep. 25, 2013, now Pat. No. 10,077,021, which is a division of application No. 12/858,071, filed on Aug. 17, 2010, now Pat. No. 8,548,645.

(60) Provisional application No. 61/234,434, filed on Aug. 17, 2009.

(56) References Cited

U.S. PATENT DOCUMENTS

| | | | | |
|---|---|---|---|---|
| 6,038,666 | A * | 3/2000 | Hsu | G07C 9/00563 |
| | | | | 726/28 |
| 6,236,120 | B1 * | 5/2001 | Loraas | B60R 25/04 |
| | | | | 307/10.6 |
| 6,274,946 | B1 * | 8/2001 | Maeda | B60R 25/24 |
| | | | | 343/901 |
| 6,624,741 | B1 | 9/2003 | Dais et al. | |
| 6,653,747 | B1 * | 11/2003 | Proefke | B60R 25/24 |
| | | | | 307/10.6 |
| 6,727,800 | B1 * | 4/2004 | Dutu | B60R 25/257 |
| | | | | 340/426.11 |
| 6,788,189 | B2 | 9/2004 | Kikkawa et al. | |
| 6,927,671 | B2 | 8/2005 | DeBono | |
| 6,950,736 | B2 | 9/2005 | Cho | |
| 7,084,734 | B2 | 8/2006 | Singh | |
| 7,392,675 | B2 * | 7/2008 | Kito | B60R 25/2063 |
| | | | | 307/10.6 |
| 8,011,214 | B2 * | 9/2011 | Katagiri | E05B 47/026 |
| | | | | 70/389 |
| 8,193,915 | B2 * | 6/2012 | McCall | B60R 25/24 |
| | | | | 340/426.36 |
| 8,548,645 | B2 | 10/2013 | Long | |
| 8,614,622 | B2 | 12/2013 | Van Wiemeersch et al. | |
| 9,205,807 | B2 | 12/2015 | Van Wiemeersch et al. | |
| 9,580,044 | B2 | 2/2017 | Van Wiemeersch et al. | |
| 9,580,045 | B2 | 2/2017 | Holub et al. | |
| 10,077,021 | B2 | 9/2018 | Long | |
| 10,189,441 | B2 | 1/2019 | Long | |
| 10,442,397 | B2 | 10/2019 | Long | |
| 10,766,454 | B2 | 9/2020 | Long | |
| 2003/0135321 | A1 | 7/2003 | Kumazaki et al. | |
| 2003/0137195 | A1 | 7/2003 | Suzuki | |
| 2005/0166650 | A1 * | 8/2005 | Shimura | E05B 19/0082 |
| | | | | 70/252 |
| 2009/0031767 | A1 * | 2/2009 | Ko | B60R 25/04 |
| | | | | 70/336 |
| 2009/0151412 | A1 * | 6/2009 | Chung | B60R 25/24 |
| | | | | 70/247 |
| 2010/0191392 | A1 * | 7/2010 | Juzswik | B60R 25/245 |
| | | | | 701/2 |
| 2010/0255953 | A1 | 10/2010 | McCullough et al. | |
| 2011/0040426 | A1 * | 2/2011 | Long | G06F 7/00 |
| | | | | 701/2 |

OTHER PUBLICATIONS

Notice of Allowance for U.S. Appl. No. 12/858,071 mailed Aug. 5, 2013.

Non-Final Office Action for U.S. Appl. No. 14/036,250 mailed Jun. 20, 2017.

Notice of Allowance for U.S. Appl. No. 14/036,250 mailed Feb. 23, 2018.

Non-Final Office Action for U.S. Appl. No. 15/959,029 mailed Aug. 6, 2018.

Notice of Allowance for U.S. Appl. No. 15/959,029 mailed Dec. 12, 2018.

Non-Final Office Action for U.S. Appl. No. 16/185,459 mailed Feb. 25, 2019.

Notice of Allowance for U.S. Appl. No. 16/185,459 mailed Jun. 7, 2019.

Non-Final Office Action for U.S. Appl. No. 16/566,618 mailed Nov. 26, 2019.

Final Office Action for U.S. Appl. No. 16/566,618 mailed Feb. 19, 2020.

Notice of Allowance for U.S. Appl. No. 16/566,618 mailed May 1, 2020.

"Decision re IPR2020-01334—Granting Institution of Inter Parties Review 35 U.S.C. § 314" for U.S. Pat. No. 8,548,645 B2, dated Jan. 21, 2021.

"Patent Owner's Preliminary Response" for U.S. Pat. No. 8,548,645 B2, dated Nov. 25, 2020.

"Petition for Inter Partes Review of U.S. Pat. No. 8,548,645", IPR2020-01334, dated Aug. 25, 2020.

Liu et al., "An Integrated Automobile Keyless Operation System", eDrive, Inc., SAE International by Univ of California Berkeley, Aug. 5, 2018.

Stembera, "Master Thesis—Cryptanalysis of Hitag-2 Cipher", Czech Technical University in Prague, Faculty of Electrical Engineering, Department of Computer Science and Engineering, May 13, 2011.

"Declaration of Scott Andrews in Support of Petition for Inter-Partes Review" for U.S. Pat. No. 8,548,645, IPR2020-01334, dated Aug. 25, 2020.

Claim Chart for U.S. Pat. No. 8,548,645, IPR2020-01334.

"Toyota Avalon Manual-2005" Jan. 2005.

Ni et al., "AES Security Protocol Implementation for Automobile Remote Keyless System", Vehicular Technology Conference, 2007.

Schmitz et al., "A New State-of-the-Art Keyless Entry System", International Congress and Exposition, Detroit, Michigan, Feb. 23-26, 1998.

IPR2020-01334—Final Written Decision Determining All Challenged Claims Unpatentable Granting Petitioner's Motion to Seal Granting Petition's Motion for Entry of Protective Order 35 U.S.C. § 318(a) dated Jan. 19, 2022.

*Engle Grange LLC* v. *Unified Patents, LLC*, Federal Circuit Decision, 2022-1524, Apr. 4, 2023.

* cited by examiner

VEHICLE MOVEMENT RESTRICTIONS PREMISED ON ELECTRONIC KEYS

CROSS REFERENCE TO RELATED APPLICATIONS

The present application is a continuation of co-pending application U.S. patent application Ser. No. 17/342,260, filed Jun. 8, 2021, which is a continuation of U.S. patent application Ser. No. 17/013,366, filed Sep. 4, 2020, which is a continuation of U.S. patent application Ser. No. 16/566, 618, filed Sep. 10, 2019, now U.S. Pat. No. 10,766,454 issued Sep. 8, 2020, which is continuation of U.S. patent application Ser. No. 16/185,459, filed Nov. 9, 2018, now U.S. Pat. No. 10,442,397 issued Oct. 15, 2019, which is a continuation of U.S. application Ser. No. 15/959,029, filed Apr. 20, 2018, now U.S. Pat. No. 10,189,441 issued on Jan. 29, 2019, which is a continuation of U.S. patent application Ser. No. 14/036,250, filed Sep. 25, 2013, now U.S. Pat. No. 10,077,021 issued on Sep. 18, 2018, which is a divisional of U.S. patent application Ser. No. 12/858,071, filed Aug. 17, 2010, now U.S. Pat. No. 8,548,645, issued on Oct. 1, 2013, which claims the benefit of U.S. Provisional Application No. 61/234,434 filed on Aug. 17, 2009, all of which are hereby incorporated herein by reference in their entirety and made part of the present application.

BACKGROUND OF THE INVENTION

This invention concerns keyless automobile lock and ignition systems (often referred to as smart key) in which the presence of a key fob is electronically detected by means of a radio pulse transponder in the key fob and antennas in the car body. In these systems, the car is unlocked automatically when the handle is operated or a button pushed. Locking is accomplished in a similar way or by simply walking away.

The ignition switch is also operated without the need to insert a key into the ignition switch lock by the same wireless detection of the presence of the key fob in the passenger compartment. The system neutralizes the electronic immobilizer usually now included in automobile electronics and allows starting the car by simply pushing a button or turning the ignition switch without the need to insert a key into the switch.

While very convenient, this system creates possibilities of security risks and also allows inconvenient situations to inadvertently arise.

For example, if after starting, the driver momentarily exits the car and somehow leaves the key fob somewhere before reentering the car, he or she can drive off, and then after reaching a destination cannot restart the car since the key fob is not present. A manual operation using the key is also not possible if the key is left with the fob.

While a warning message is displayed on the instrument panel in some designs, indicating that the key fob is not detected by the system, it is easy to not notice this displayed message which may be blocked by the steering wheel.

In another common situation which could be encountered, if a driver allows a valet attendant to drive off with the car, if the driver does not give the key fob to the attendant, the attendant will be unable to start the car when retrieving the car until after obtaining the key fob from the driver, slowing the return of the car to the driver.

Also, if the valet forgets to surrender the key fob to the owner, the owner can unknowingly drive away without the key fob and subsequently be unable to restart the car with the car (which usually is left running while the attendant gets out and the owner enters the car).

Security risks can also arise, as where a car is inadvertently left running (which can be very quiet and nearly undetectable in many cars) and with the doors unlocked, such that a thief can simply enter and drive off in the car.

With newer locking systems, it is easy for a driver to think the car has been locked when in fact the locking has not been accomplished.

Again, beep cues or visual displays can easily be missed, particularly when a driver is in a hurry.

It is also known to lock the transmission shift lever until the key fob is authenticated by the smart key controller system as described in U.S. 2009/0151412A1. However, once authentication has occurred in that system, the transmission shift lever can be freely operated such that the above problems are still encountered.

Accordingly, it is an object of the present invention to provide a keyless or smart key system of the type described which has a fail-safe feature that insures that the above described inconvenience or security risk situations are positively prevented without the need for particular attentiveness of the driver the location of the key fob on to related beep cues or displays.

SUMMARY OF THE INVENTION

The above recited object and other objects which will be understood upon a reading of the following specification and claims are achieved by a two-step detection authentication process in which after the presence of the key fob initially authenticated, the ignition button or switch is activated for keyless starting as in prior systems. A shift lever interlock is also included, controlled by the keyless system controller, positively preventing shifting of the transmission shift lever into a drive gear unless the owner's key-fob is detected by the system as being present within the passenger compartment at the time the driver presses the brake pedal in order to allow shifting into a drive gear.

Thus, if the car is started and idling in park (or neutral), the shift lever cannot be shifted into a drive gear, positively preventing driving the car away unless the key-fob is detected and authenticated by the system at the same time as the shifting attempt is made.

This positively prevents the inconvenient situations and security risks arising from a car being able to be driven away without the key-fob being located in the passenger compartment of the car, such that the attentiveness of the operator is not required in order to insure that such situations will not arise.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
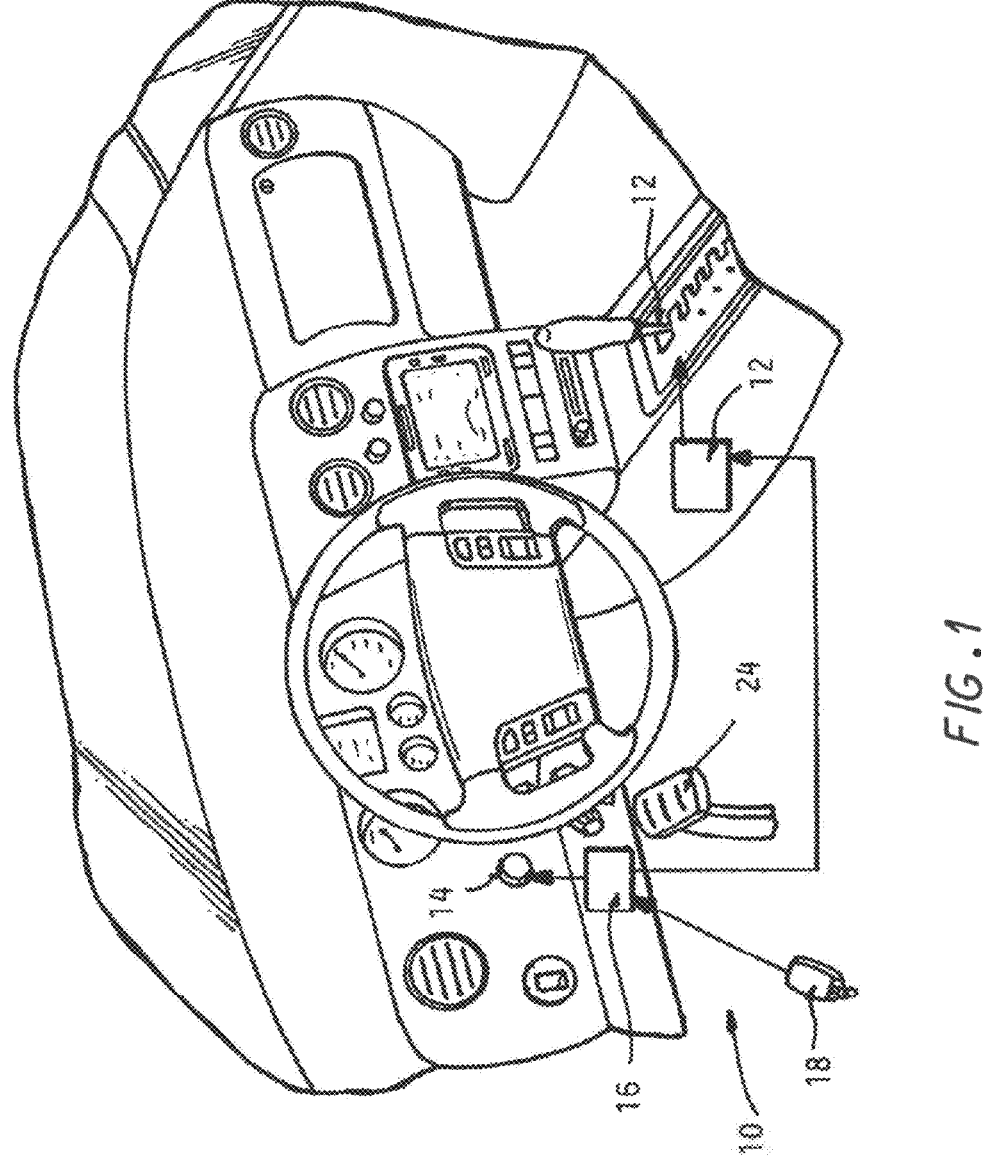
FIG. 1 is a pictorial diagrammatic view of a portion of the passenger compartment of an automobile with keyless system components included according to the present invention being depicted diagrammatically.
Figure 2:
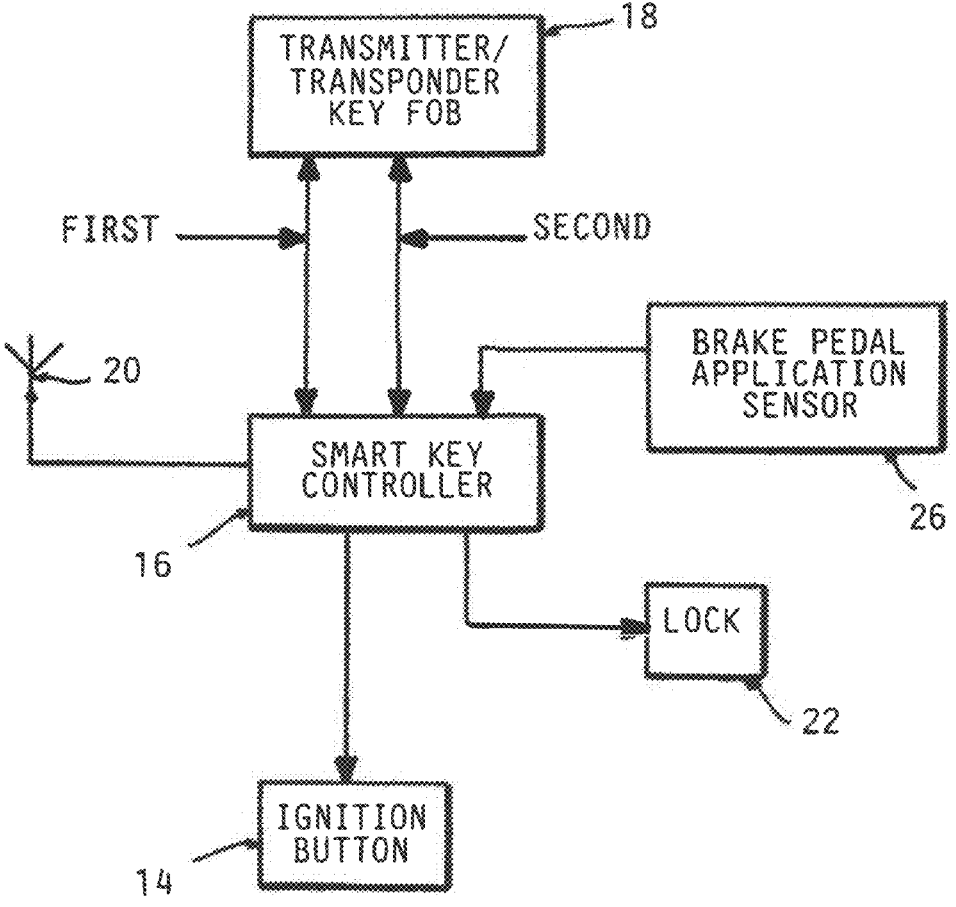
FIG. 2 is a block diagram of components of the keyless system depicting the two step detection authentication operation of the invention.

Referring to FIG. 1, a portion of the interior of an automobile passenger compartment 10 is shown in fragmentary form.

A center console mounted transmission shift lever 12 is provided in conventional fashion. A dash mounted starter button 14 is provided (or a turnable ignition switch which could also accept a key). A keyless system controller 16 is depicted diagrammatically which detects the presence of a coded key fob 18 in the passenger compartment 10 as by one or more car body mounted antennas 20 receiving transponder coded pulse codes transmitted by the key-fob 18 when interrogated by the smart key controller 16 in the well known manner.

The system controller 16 enables the ignition push button 14 when the presence of the correctly coded key fob 18 in the compartment 10 is detected and authenticated, such that the car can be started by merely pushing the button 14 without the use of a key, in the well known manner.

According to the present invention, a transmission lever lock 22 is provided, such as described in U.S. 2009/0151412A1, which positively prevents movement of the transmission selector or shift lever 12 to a drive position unless the brake pedal 24 is depressed and also unless the key fob 18 in the passenger compartment 12 is again detected and authenticated by the system controller 16.

According to the invention, such detection-authentication necessary to shift the lever 12 is not carried out at the same time as when the ignition detection-authentication is carried out. This second authentication is carried out at the time the brake pedal is pressed and a signal is generated and sent by a sensor 26 which detects the pressing of the brake pedal 24 to the smart key controller 22, which carries out a second detection authentication of the key fob 18 prior to operating the release of the transmission lever lock actuator 22.

Thus, if the key fob 18 is removed from the passenger compartment 10 after the car is started, the vehicle will not be able to be operated as the transmission lever 12 will remain locked even when the brake pedal is pressed.

This prevents operation of the vehicle even after the key fob 18 has been initially authenticated and the car started and running, and thus positively prevents operation of the vehicle unless the key fob 18 is authenticated as being within the passenger compartment.

What is claimed is:

1. A method for preventing a motor vehicle from being driven away without its associated electronic key being present, comprising:

placing the motor vehicle in a park mode with the motor vehicle not started;

detecting depression of a brake pedal of the motor vehicle while the motor vehicle is in the park mode;

responsive to the detection of the depression of the brake pedal, perform a first code authentication using wireless signals to determine whether a particular electronic key device linked to the motor vehicle is then present within the motor vehicle;

determining whether the first code authentication was successful;

receiving a start request initiated by a user of the motor vehicle;

permitting, in response to the start request being received, the motor vehicle to be started if the first code authentication was determined to be successful provided that the brake pedal that was detected to be depressed has remained depressed;

starting the motor vehicle if the permitting determines that the motor vehicle is permitted to be started;

subsequently determining after the starting of the motor vehicle whether the brake pedal is no longer depressed;

after the determining determines that after the starting of the motor vehicle the brake pedal is no longer depressed, requiring a second code authentication in order to permit the motor vehicle to be shifted from the park mode to a drive mode such that the motor vehicle can be driven to another location different than its present location;

subsequently determining after the second key code authentication has been required, whether the brake pedal has been again depressed while the motor vehicle is in the park mode;

responsive to the detection of the brake pedal being again depressed, perform a second code authentication using wireless signals to determine whether a particular electronic key device linked to the motor vehicle is then present within the motor vehicle;

determining whether the second code authentication was successful; and subsequently, if the determining determines that the second code authentication was successful and provided that the brake pedal that was detected to be again depressed has remained depressed, permitting the motor vehicle to be shifted from the park mode to a drive mode such that the motor vehicle can be driven to another location different than its present location.

2. The method as recited in claim 1, wherein the method comprises:

after the starting of the motor vehicle and provided that the brake pedal that was detected to be depressed has remained depressed, permitting the motor vehicle to be shifted from the park mode to a drive mode such that the motor vehicle can be driven to another location different than its present location without requiring the second code authentication therefor.

3. The method as recited in claim 2, wherein the particular electronic key device provides a first electronic key used for the first code authentication and a second electronic key used for the second code authentication.

4. The method as recited in claim 2, wherein the particular electronic key device provides an electronic key for use with the first code authentication and the second code authentication.

5. The method as recited in claim 1, wherein the method comprises:

subsequently, if the determining determines that the second code authentication was not successful, preventing the motor vehicle to be shifted from the park mode to a drive mode.

6. The method as recited in claim 5, wherein the method comprises:

after the starting of the motor vehicle and provided that the brake pedal that was detected to be depressed has remained depressed, permitting the motor vehicle to be shifted from the park mode to a drive mode such that the motor vehicle can be driven to another location different than its present location without requiring the second code authentication therefor.

7. The method as recited in claim 6, wherein the particular electronic key device provides a first electronic key used for the first code authentication and a second electronic key used for the second code authentication.

8. The method as recited in claim 6, wherein the particular electronic key device provides an electronic key for use with the first code authentication and the second code authentication.

9. The method as recited in claim 6, wherein the particular electronic key device used for the first code authentication is the same as the particular electronic key device used for the second code authentication.

10. The method as recited in claim 1, wherein the particular electronic key device used for the first code authentication is the same as the particular electronic key device used for the second code authentication.

11. The method as recited in claim 1, wherein the method comprises:

displaying a message to the user that the particular electronic key device is not detected if the determining determines that the second code authentication was unsuccessful.

12. The method as recited in claim 11, wherein the method comprises:

after the starting of the motor vehicle and provided that the brake pedal that was detected to be depressed has remained depressed, permitting the motor vehicle to be shifted from the park mode to a drive mode such that the motor vehicle can be driven to another location different than its present location without performing the second code authentication.

13. The method as recited in claim 12, wherein the particular electronic key device used for the first code authentication is the same as the particular electronic key device used for the second code authentication.

14. The method as recited in claim 1, wherein the motor vehicle includes an antenna configured to detect the wireless signals within the motor vehicle, and wherein the determining of whether the particular electronic key device linked to the motor vehicle is then present within the motor vehicle uses the antenna to detect the wireless signals.

15. The method as recited in claim 14, wherein the motor vehicle includes a start push button, and wherein the receiving of the start request initiated by the user of the motor vehicle comprises detecting a push on the start push button.

16. The method as recited in claim 15, wherein the method comprises:

after the starting of the motor vehicle and provided that the brake pedal that was detected to be depressed has remained depressed, permitting the motor vehicle to be shifted from the park mode to a drive mode such that the motor vehicle can be driven to another location different than its present location without performing the second code authentication.

17. The method as recited in claim 16, wherein the method comprises:

displaying a message to the user that the particular electronic key device is not detected if the determining determines that the second code authentication was unsuccessful.

18. The method as recited in claim 17, wherein the particular electronic key device used for the first code authentication is the same as the particular electronic key device used for the second code authentication.

19. A motor vehicle, comprising:

a brake pedal application sensor operatively connected to a brake pedal;

a push to-start button;

a shifter lock; and a controller operatively connected to the brake pedal application sensor, the push-to-start button, and the shifter lock, the controller configured to prevent a motor vehicle from being driven away without its associated electronic key being present by carrying out the operations of:

placing the motor vehicle in a park mode with the motor vehicle not started;

detecting, via the brake pedal application sensor, depression of the brake pedal of the motor vehicle while the motor vehicle is in the park mode;

responsive to the detection of the depression of the brake pedal, perform a first code authentication using wireless signals to determine whether a particular electronic key device linked to the motor vehicle is then present within the motor vehicle;

determining whether the first code authentication was successful;

receiving, via the push to-start button, a start request initiated by a user of the motor vehicle;

permitting, in response to the start request being received, the motor vehicle to be started if the first code authentication was determined to be successful provided that the brake pedal that was detected to be depressed has remained depressed;

starting the motor vehicle if the permitting determines that the motor vehicle is permitted to be started;

subsequently determining, via the brake pedal application sensor, after the starting of the motor vehicle whether the brake pedal is no longer depressed;

after the determining determines that after the starting of the motor vehicle the brake pedal is no longer depressed, requiring a second code authentication in order to permit the motor vehicle to be shifted from the park mode to a drive mode by unlocking the shifter lock, such that the motor vehicle can be driven to another location different than its present location;

subsequently determining, via the brake pedal application sensor, after the second key code authentication has been required, whether the brake pedal has been again depressed while the motor vehicle is in the park mode;

responsive to the detection of the brake pedal being again depressed, perform a second code authentication using wireless signals to determine whether a particular electronic key device linked to the motor vehicle is then present within the motor vehicle;

determining whether the second code authentication was successful; and subsequently, if the determining determines that the second code authentication was successful and provided that the brake pedal that was detected to be again depressed has remained depressed, permitting the motor vehicle to be shifted from the park mode to a drive mode by unlocking the shifter lock, such that the motor vehicle can be driven to another location different than its present location.

20. The motor vehicle as recited in claim 19, wherein the controller is further configured to carry out the operation of:

after the starting of the motor vehicle and provided that the brake pedal that was detected to be depressed has remained depressed, permitting the motor vehicle to be shifted from the park mode to a drive mode by unlocking the shifter lock, such that the motor vehicle can be driven to another location different than its present location without performing the second code authentication.

\* \* \* \* \*